UNITED STATES PATENT OFFICE.

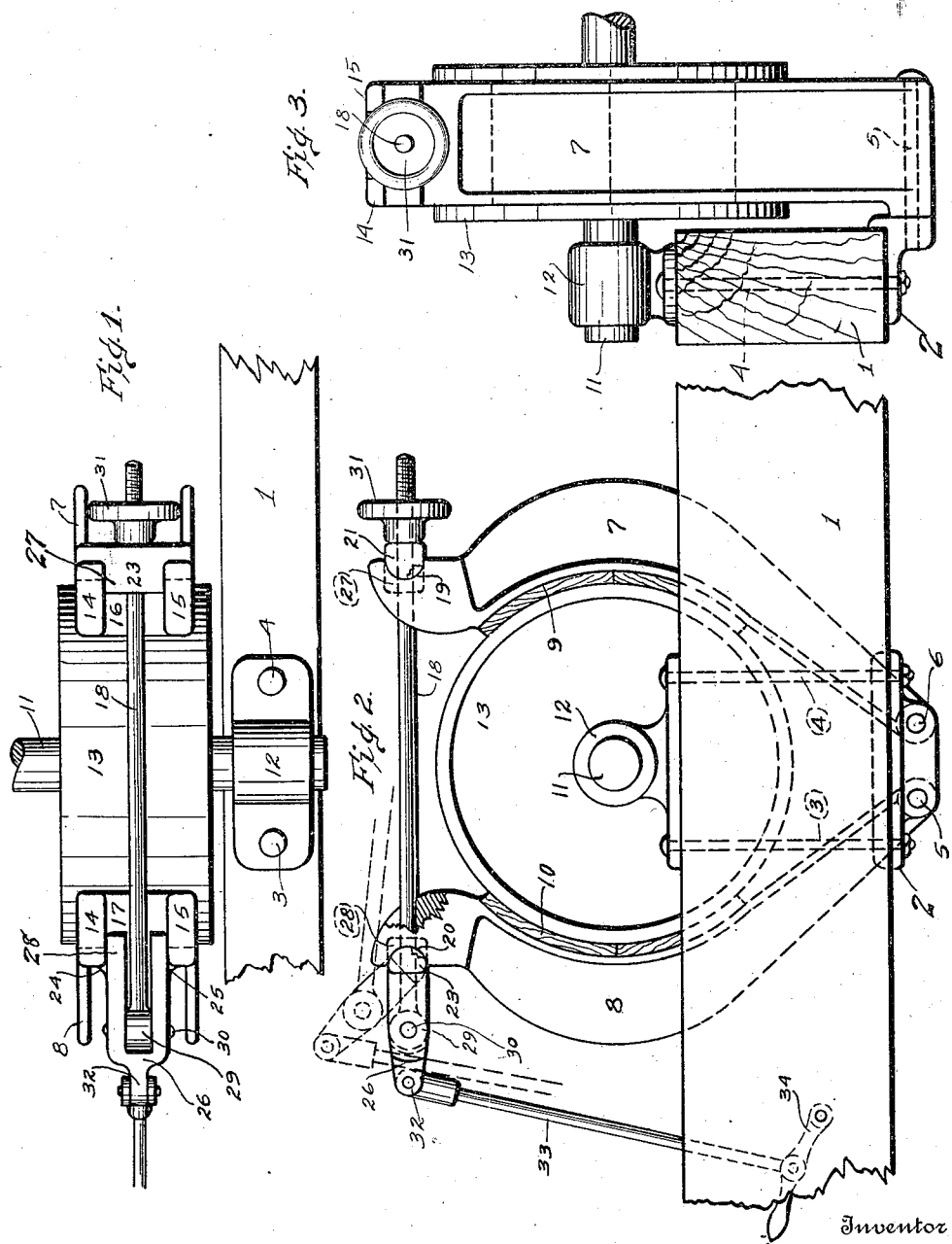
R. R. SANDERSON.
BRAKE MECHANISM.
APPLICATION FILED JULY 11, 1917.
1,263,290.
Patented Apr. 16, 1918.

RAY R. SANDERSON, OF ORRVILLE, OHIO.

BRAKE MECHANISM.

1,263,290.  Specification of Letters Patent.  Patented Apr. 16, 1918.

Application filed July 11, 1917. Serial No. 179,973.

*To all whom it may concern:*

Be it known that I, RAY R. SANDERSON, a citizen of the United States of America, residing at Orrville, in the county of Wayne and State of Ohio, have invented certain new and useful Improvements in Brake Mechanism, of which the following is a specification.

This invention relates to a brake mechanism.

One of the objects of the present invention consists in pivotally mounting the brake shown in such a manner as to permit the gravity thereof to maintain said shoes free from the drum or in inoperative position under normal conditions.

The primary object of the invention is to provide means of connecting the free ends of the shoes through the medium of an adjustable bolt and toggle lever joint which permits variable and simultaneous friction to be applied by the brake shoes upon the brake drum for braking purposes.

A further object is to provide a clamping brake mechanism comprising a knee lever joint, a yieldable block and an adjustable bolt and combining and arranging them to coöperate with each other in such a manner as to exert a pressure upon the brake shoes, simultaneously forcing them in frictional contact if desired with the brake drum by the actuation of a lever rod which is connected to said knee lever joint; said mechanism also being operable to free the shoes from contact with the brake drum at the will of the operator.

Another object is to provide an adjustable knee joint clamping means for brake shoes that is operable to a dead center position by the manipulation of a lever rod to clamp and lock said shoes to exert a predetermined pressure or frictional contact upon the periphery of the brake drum; said lever rod being also operable to break said knee lever joint, thereby permitting the brake shoes to pivot simultaneously and automatically by gravity to an inoperative position or free from contact with the periphery of the brake drum.

These and other objects are attained by the mechanism illustrated in the accompanying drawing, in which:

Figure 1 is a plan view of the brake mechanism showing one end of the brake drum shaft journaled in a bearing which is attached to a sill of a conventional frame of a well drilling machine or the like.

Fig. 2 is a side elevation of the brake mechanism showing the position of the lever knee joint and operating rod in operative position in full lines, also showing said lever and operating rod in inoperative position in dotted lines.

Fig. 3 is a right side end elevation of Fig. 2.

In the drawings, reference numeral 1 represents a fragment of a sill of a conventional frame and 2 a shouldered bracket which is secured to said sill by the bolts 3 and 4. The bracket is provided with apertures to receive and secure the ends of bolts 5 and 6. Brake shoes 7 and 8 are pivotally mounted at their lower ends upon the bolts 5 and 6 and formed and constructed so as to pivot by gravity to normally maintain the brake linings 9 and 10 out of contact with a brake drum or the like, as will be described hereinafter.

The type of brake drum mechanism preferably used comprises a brake drum shaft 11 journaled in suitable bearings 12 and a brake drum 13 which is mounted on said shaft 11 in alinement with the brake shoes. The walls 14 and 15 of the shoes extend above the body portion at their free ends forming slots 16 and 17 to receive a clamping bolt 18. The walls 14 and 15 at the points indicated by reference numerals 19 and 20 are preferably provided with semi-circular depressions or seats to receive and engage the semi-circular or rounded portions 21 and 22 provided on the separable block 23 and the semi-circular or rounded portions 24 and 25 provided on the bifurcated lever knee joint 26.

A portion 27 of the block 23 extends into the slot 16 and the ends 28 of the bifurcated knee joint lever extends into the slot 17 for guiding purposes, as shown in Fig. 1. The clamping bolt 18 is provided with an eye 29 at one end by means of which it is pivotally secured to the bifurcated knee joint lever by a pin 30. The opposite end of the clamping bolt 18 passes through and supports the block 23 and the end is threaded to engage an adjustable wheel nut 31. An ear 32 is provided on the bifurcated lever knee joint and a link rod 33 is pivotally attached thereto at one end.

The opposite end of the link rod is pivotally attached to a lever as shown at 34 or to any other well known type of lever operating mechanism as the means for operating the lever knee joint forms no part of the present invention.

In the operation of the brake mechanism, the operator manipulates the lever 34 to force the knee joint to the position shown in full lines as shown in Fig. 2, and simultaneously therewith both shoes are drawn toward each other forcing the brake lining in frictional contact with the brake drum, or in other words, in operative position, thereby breaking or retarding the rotation of the drum.

The extent of the frictional contact of the brake lining of the brake shoes can be varied to exert more or less pressure against the brake drum as desired, by adjusting the wheel nut against and from the block 23. When it is desired to force the brake shoes into inoperative position, the lever 34 is manipulated to break the knee joint permitting the lever knee joint to assume the position shown in dotted lines, (see Fig. 2) at which time the shoes pivot by gravity withdrawing and maintaining the brake linings of the shoes free from contact with the drum or in inoperative position.

Attention is called to the fact that all of the pressure parts of the mechanism under strain of the clamping bolt when it is manipulated to force the linings of the brake shoes in contact with the brake drum are yieldable, thereby permitting them to assume their proper position to resist undue strain when they are subjected to pressure of the clamping bolt when the mechanism is forced into operative position.

What is claimed is:

1. A brake mechanism comprising pivotally mounted brake shoes, and an operating means therefor including blocks having a rocking interfit and otherwise free coöperation with the respective shoes, means connecting the blocks to maintain their interfit with the shoes, and mechanism for rocking one of the blocks with relation to its shoe to vary the spaced relation of the shoes through said connecting means.

2. A brake mechanism comprising pivotally mounted brake shoes, blocks having a rocking interfit but otherwise free coöperation with the respective shoes, a rod connecting the blocks, and means for rocking one of the blocks with relation to its shoe to vary the spaced relation of the shoes through said rod.

3. A brake mechanism comprising pivotally mounted brake shoes, blocks mounted for rocking in and otherwise free of connection with the respective shoes, a rod pivotally connected to one block and adjustably connected to the other, and means for rocking the pivotally connected block on its shoe to change the position of the pivotally mounted end of the rod.

4. A brake mechanism comprising pivotally mounted brake shoes, blocks mounted for rocking in and otherwise free of connection with the respective shoes, one of said blocks having a bifurcated extension, a rod slidably engaging one block and pivotally connected in the bifurcated extension of the other, and means for rocking the block to which the rod is pivotally connected.

5. A brake mechanism comprising pivotally mounted brake shoes, blocks mounted for rocking in and otherwise free of connection with the respective shoes, a rod pivotally connected to one block and adjustably connected to the other, and means for rocking the pivotally connected block in its shoe to move the rod without changing the bearing relation of either block to its shoe.

6. A brake mechanism comprising pivotally mounted brake shoes, blocks mounted for rocking interfit with the respective shoes, one of the blocks having a bifurcated extension, a rod pivotally connected to said extension beyond the rocking bearing of the block, means connecting the rod to the other of said blocks, and means for rocking the block having the extension.

7. A brake mechanism comprising pivotally mounted brake shoes, blocks mounted for rocking interfit with the respective shoes, one of said blocks having a bifurcated extension, a rod connected to one block and pivotally mounted in the bifurcated extension, and means for rocking the block having the extension, the adjacent shoe being formed to coöperate with the bifurcated extension for guiding the said block during the rocking movement.

8. A brake mechanism comprising pivotally mounted brake shoes, blocks mounted for rocking interfit with the respective shoes, a rod connecting the blocks and without connection with the shoes, and means for rocking the block of one of the shoes to arrange the rod in a position alined with the blocks and bearings therefor or in a position at an angle to such alined position.

In testimony whereof I affix my signature.

RAY R. SANDERSON.

Copies of this patent may be obtained for five cents each, by addressing the "Commissioner of Patents, Washington, D. C."